United States Patent
Li et al.

(10) Patent No.: US 12,525,052 B2
(45) Date of Patent: Jan. 13, 2026

(54) FINGERPRINT SEGMENTATION METHOD AND DEVICE

(71) Applicant: Samsung Electronics Co., Ltd., Suwon-si (KR)

(72) Inventors: Hanhui Li, Xi'an (CN); ChunMiao Jiang, Xi'an (CN); Xiaochun Yan, Xi'an (CN); Huaiwen Bai, Xi'an (CN); Jiangbo Chen, Xi'an (CN); Wenyan Zheng, Xi'an (CN); Yanjun Chen, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/891,077

(22) Filed: Sep. 20, 2024

(65) Prior Publication Data

US 2025/0131765 A1 Apr. 24, 2025

(30) Foreign Application Priority Data

Oct. 18, 2023 (CN) .......................... 202311352347.8

(51) Int. Cl.
  *G06V 40/12* (2022.01)
  *G06V 10/26* (2022.01)
  *G06V 10/77* (2022.01)

(52) U.S. Cl.
  CPC ........ *G06V 40/1347* (2022.01); *G06V 10/267* (2022.01); *G06V 10/7715* (2022.01)

(58) Field of Classification Search
  CPC ............. G06V 40/1347; G06V 10/267; G06V 10/7715; G06V 40/1359; G06V 10/36; G06T 7/136; G06T 7/194; G06T 7/62; G06T 2207/20024; G06T 2207/20112
  See application file for complete search history.

(56) References Cited

U.S. PATENT DOCUMENTS

| | | |
|---|---|---|
| 8,385,612 B2 | 2/2013 | Tatara |
| 10,078,646 B2 | 9/2018 | Bandic et al. |
| 10,776,604 B2 | 9/2020 | Maurer et al. |
| 10,963,666 B2 | 3/2021 | Kazdaghli |
| 11,380,127 B2 | 7/2022 | Cazasnoves et al. |

(Continued)

FOREIGN PATENT DOCUMENTS

| CN | 101299238 A | 11/2008 |
|---|---|---|
| CN | 102629318 A | 8/2012 |

(Continued)

OTHER PUBLICATIONS

Mehtre et al. "Segmentation of fingerprint images using the directional image," Pattern Recognition, vol. 20, No. 4, pp. 429-435 (1987).

(Continued)

*Primary Examiner* — Premal R Patel
(74) *Attorney, Agent, or Firm* — Fish & Richardson P.C.

(57) ABSTRACT

A fingerprint segmentation method and device is provided. The fingerprint segmentation method may include dividing a fingerprint image into a plurality of sub-images, pooling each sub-image to acquire a feature map of the fingerprint image, and segmenting the feature map based on a region growing algorithm to acquire a fingerprint region in the fingerprint image.

19 Claims, 5 Drawing Sheets

(56) References Cited

U.S. PATENT DOCUMENTS

| | | | |
|---|---|---|---|
| 2009/0123040 A1* | 5/2009 | Tatara | G06V 40/1347 382/125 |
| 2013/0100267 A1 | 4/2013 | Baek | |
| 2017/0235998 A1 | 8/2017 | Jin et al. | |
| 2019/0188443 A1* | 6/2019 | Matsunami | G06V 10/993 |
| 2021/0004560 A1 | 1/2021 | Ding et al. | |
| 2021/0327070 A1* | 10/2021 | Wang | G06T 7/194 |
| 2022/0084319 A1* | 3/2022 | Zhu | G06V 40/1376 |

FOREIGN PATENT DOCUMENTS

| | | |
|---|---|---|
| CN | 102208021 B | 12/2012 |
| CN | 106342325 B | 8/2013 |
| CN | 105389563 A | 3/2016 |
| CN | 105844210 B | 4/2020 |
| CN | 110110697 B | 3/2021 |
| EP | 2 131 307 B1 | 12/2012 |
| FR | 3 084 943 B1 | 4/2021 |
| FR | 3102600 B1 | 10/2021 |

OTHER PUBLICATIONS

Mehtre et al. "Segmentation of fingerprint images—A composite method," Pattern Recognition, vol. 22, No. 4, pp. 381-385, (1989).

Ratha, et al., "Adaptive flow orientation-based feature extraction in fingerprint images," Pattern Recognition, vol. 28, No. 11, pp. 1657-1672, (1995).

Maio et al., "Direct gray-scale minutiae detection in fingerprints," IEEE Transactions on Pattern Analysis Machine Intelligence, vol. 19, No. 1, (1997).

Shi et al. "A New Segmentation Algorithm for Low Quality Fingerprint Image," in Proc. Int. Conf. on Image and Graphics, pp. 314-317, (2004).

Shen, et al. "Quality Measures of Fingerprint Images, "in Proc. Int. Conf. on Audio- and Video-Based Biometric Person Authentication (3rd), pp. 266-271, (2001).

Alonso-Fernandez, et al. "An Enhanced Gabor Filter-Based Segmentation Algorithm for Fingerprint Recognition Systems," in Proc. Int. Symp. on Image and Signal Processing and Analysis, (2005).

J. Kang et al. "Fingerprint Segmentation Using Cellular Neural Network," 2009 International Conference on Computational Intelligence and Natural Computing, 2009, pp. 11-14, doi: 10.1109/CINC.2009.246 (2009).

Sheng Li et al., "An application of linear SVM to fingerprint image segmentation," 2011 International Conference on Electric Technology and Civil Engineering (ICETCE), 2011, pp. 994-997, doi: 10.1109/ICETCE.2011.5776494 (2011).

Xinjian Chen, et al. "Segmentation of Fingerprint Images Using Linear Classifier", ERASIP Journal on Applied Signal Processing 2004:4, pp. 480-494 (2004).

Alaa Ahmed Abbood, et al. "A Review of Fingerprint Image Pre-processing" Jounral Teknolohi, 69:2, eISSN 2180-3722 (2014).

M. Usman Akram, et al. "Fingerprint Image Segmentation Based on Boundary Values," Department of Computer Engineering, Proceedings of the Third International Conference on Computer Vision Theory and Applications, pp. 134-138, (2008).

* cited by examiner

| Serial number | Original image | Segmentation results of the present invention |
|---|---|---|
| 1 |  |  |
| 2 |  |  |
| 3 |  |  |
| 4 |  |  |
| 5 |  |  |
| 6 |  |  |

FINGERPRINT SEGMENTATION METHOD AND DEVICE

CROSS-REFERENCE TO RELATED APPLICATIONS

The present disclosure relates to the image processing field, and more specifically, to fingerprint segmentation methods and/or devices. This application claims priority under 35 U.S.C. § 119 to Chinese Patent Application No. 202311352347.8, filed on Oct. 18, 2023 in the State Intellectual Property Office of the P.R.C., the disclosure which is incorporated herein in its entirety by reference.

BACKGROUND

Technical Field

The present disclosure relates to the image processing field, and more specifically, to fingerprint segmentation methods and/or devices.

Description of the Related Art

Fingerprint segmentation is one of the key techniques for fingerprint recognition, which usually indicates that the fingerprint image is segmented into two parts of foreground (e.g., fingerprint region) and background (e.g., non-fingerprint region).

Existing fingerprint segmentation algorithms usually extract features from the fingerprint image according to the direction of the ridge lines, and the extracted features may usually include the gray scale histogram value, gray scale variance, ridge flow information, gradient, and so on. After extracting the features, classifiers such as gray scale statistic, Gabor filter, neural network, Support Vector Machine (SVM), etc. may be used for discriminating to determine the foreground and/or background in the fingerprint image. However, the ridge line orientation computation and complex feature extraction performed by existing fingerprint segmentation algorithms during feature extraction may result in a huge amount of computation.

In addition, the classifiers employed by existing fingerprint segmentation algorithms for foreground and/or background discrimination may consume a large amount of computational resources. In some embedded devices (e.g., smart card, fingerprint lock, fingerprint bank card, etc.), it is required to complete the segmentation of a fingerprint image and give a result in milliseconds with very limited computational resources, but it is difficult to realize using the existing technology.

Therefore, there is a need for a lightweight fingerprint segmentation algorithm that combines low latency, low memory occupation and high accuracy.

SUMMARY

According to an example embodiment of the present disclosure, a fingerprint segmentation method may include dividing a fingerprint image into a plurality of sub-images, pooling each of the sub-images to acquire a feature map of the fingerprint image, and segmenting the feature map based on a region growing algorithm to acquire a fingerprint region in the fingerprint image.

The sub-images each may have a square shape, and side lengths of the sub-images are equal to or greater than an average width of ridge lines and/or an average width of valley lines of the fingerprint image.

The pooling of each of the sub-images may include taking a smallest gray value included in each of the sub-images as a feature value thereof, and acquiring the feature map of the fingerprint image based on the feature value of each of the sub-images.

The fingerprint segmentation method may further include filtering the feature map before segmenting the feature map.

The filtering of the feature map may include performing a set of operations for each feature value of the feature map. The set of operations may include determining a respective feature value to be a noise point if the respective feature value is less than a threshold and a number of feature values, among a plurality of neighboring feature values, that are not less than the threshold exist or if the respective feature value is not less than the threshold and the number of feature values, among the neighboring feature values, that are less than the threshold, and replacing the respective feature value determined to be the noise point using an average of the neighboring feature values.

The segmenting of the feature map may include adding at least one feature value at boundaries of the feature map to a seed sequence, repeating a set of operations for a first feature value in the seed sequence until the seed sequence is empty. The set of operations may include, for the first feature value in the seed sequence, (1) moving the first feature value out of the seed sequence if the first feature value is less than a predetermined threshold, and adding select neighboring feature values that are not less than the threshold, among a plurality of neighboring feature values of the first feature value that have never been added to the seed sequence, into the seed sequence, and (2) moving the first feature value out of the seed sequence if the first feature value is not less than the predetermined threshold, and determining the sub-images corresponding to feature values in the feature map that have never been added to the seed sequence as the fingerprint region.

The threshold may be a smaller one of an average gray value of the fingerprint image and a pre-calculated average gray value based on a plurality of previously acquired fingerprint images.

According to an example embodiment of the present disclosure, a fingerprint segmentation device may include one or more processors configured to divide a fingerprint image into a plurality of sub-images, pool each sub-image to acquire a feature map of the fingerprint image, and segment the feature map based on a region growing algorithm to acquire a fingerprint region in the fingerprint image.

The sub-images may have a square shape, and side lengths of the sub-images are equal to or greater than an average width of ridge lines and/or an average width of valley lines of the fingerprint image.

The one or more processors may be further configured to take a smallest gray value included in each of the sub-images as a feature value thereof, and acquire the feature map of the fingerprint image based on the feature value of each of the sub-images.

The one or more processors may be further configured to filter the feature map before segmenting the feature map.

The one or more processors may be further configured to perform a set of operations for each feature value of the feature map. The set of operations may include determining a respective feature value to be a noise point, if the respective feature value is less than a threshold and a number of feature values, among a plurality of neighboring feature values, that are not less than the threshold exist, or if the respective feature value is not less than the threshold and the number of feature values, among the neighboring feature values, that are less than the threshold exist, and replacing the respective feature value determined to be the noise point using an average of the neighboring feature values.

The one or more processors may be further configured to add at least one feature value at boundaries of the feature map to a seed sequence, repeat a set of operations for a first feature value in the seed sequence until the seed sequence is empty. The set of operations may include, for the first feature value in the seed sequence, (1) moving the first feature value out of the seed sequence if the first feature value is less than a threshold, and adding select neighboring feature values that are not less than the threshold, among a plurality of neighboring feature values of the first feature value that have never been added to the seed sequence, into the seed sequence and (2) moving the first feature value out of the seed sequence if the first feature value is not less than the threshold, and determining the sub-images corresponding to feature values in the feature map that have never been added to the seed sequence as the fingerprint region.

The threshold may be a smaller of an average gray value of the fingerprint image and a pre-calculated average gray value based on a plurality of previously acquired fingerprint images.

According to an example embodiment of the present disclosure, an electronic device may include a memory having computer-executable instructions stored thereon, and a processor configured to perform the aforementioned method.

According to an example embodiment of the present disclosure, there is provided a computer readable medium having computer-executable instructions stored thereon, which when executed by a processor, cause a fingerprint segmentation device to perform the aforementioned method.

According to some example embodiments of the present disclosure, the algorithm complexity may be greatly reduced by using a pooling operation, the number of times of the foreground and background discrimination may be reduced by using a filtering operation and a region growing algorithm, thereby accelerating the segmentation speed, obtaining the segmentation results quickly, and guaranteeing the segmentation effect at the same time. Further, the speed of the foreground and background discrimination may be greatly improved by applying adaptive thresholds to the filtering and the segmentation operations. Still further, when applied to a quality control module in a fingerprint recognition device, small area fingerprint images (such as fingerprint images with the foreground area less than 70%) may be rejected more accurately. Thus, the fingerprint segmentation method and device according to some example embodiments of the present inventive concepts may be applied to an embedded (e.g., a smart card) fingerprint recognition device that has few computational resources and high latency requirements so as not to increase the latency and memory usage in fingerprint entry and quality inspection process.

BRIEF DESCRIPTION OF THE DRAWINGS

The above and other purposes and features of the present inventive concepts will become clearer through the following detailed descriptions made in conjunction with the accompanying figures, in which.

DETAILED DESCRIPTION

Hereinafter, various example embodiments of the present disclosure are described with reference to the accompanying drawings, in which like reference numerals are used to depict the same or similar elements, features, and structures. However, the present disclosure is not intended to be limited by the various example embodiments described herein and it is intended that the present disclosure covers all modifications, equivalents, and/or alternatives of the disclosed example embodiments, provided they come within the scope of the appended claims and their equivalents. The terms and words used in the following description and claims are not limited to their dictionary meanings, but are merely used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms include plural forms, unless the context clearly dictates otherwise. The terms "include", "include", and "have", used herein, indicate disclosed functions, operations, or the existence of elements, but does not exclude other functions, operations, or elements.

For example, the expressions "A or B" or "at least one of A and (or) B" may indicate A and B, A, or B. For instance, the expression "A or B" or "at least one of A and/or B" may indicate (1) A, (2) B, or (3) both A and B.

In various example embodiments of the present disclosure, it is intended that when a component (e.g., a first component) is referred to as being "coupled" or "connected" with/to another component (e.g., a second component), the component may be directly connected to the other component or may be connected through another component (e.g., a third component). In contrast, when a component (e.g., a first component) is referred to as being "directly coupled" or "directly connected" with/to another component (e.g., a second component), another component (e.g., a third component) does not exist between the component and the other component.

The expression "configured to", used in describing various embodiments of the present disclosure, may be used interchangeably with expressions such as "suitable for", "having the capacity to", "designed to", "adapted to", "made to", and "capable of", for example, according to the situation. The term "configured to" may not necessarily indicate "specifically designed to" in terms of hardware. Instead, the expression "a device configured to" in some situations may indicate that the device and another device or part are "capable of". For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe certain example embodiments of the present disclosure, but are not intended to limit the scope of other example embodiments. Unless otherwise indicated herein, all terms used herein, including technical or scientific terms, may have the same meanings that are generally understood by those skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding some embodiments of the present disclosure.

Figure 1:
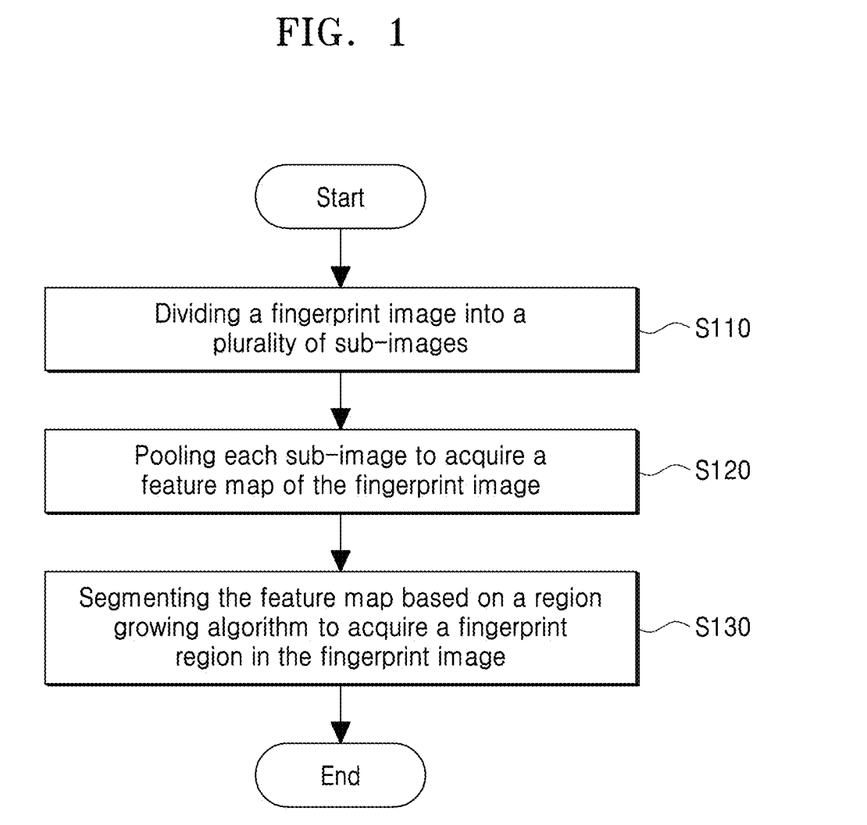
FIG. 1 is a flowchart illustrating a fingerprint segmentation method according to an example embodiment of the present inventive concepts.

FIG. 1 is a flowchart illustrating a fingerprint segmentation method according to an example embodiment of the present inventive concepts.

Referring to FIG. 1, at step S110, a fingerprint image may be divided into a plurality of sub-images. Herein, only as an example and not as a limitation, the sub-images may have a square shape, and side lengths of the sub-images are equal to or greater than an average width of ridge lines and/or an average width of valley lines of the fingerprint image. In addition, being greater than the average width of ridge lines and/or the average width of valley lines of the fingerprint image may mean being slightly greater than the average width of ridge lines and/or the average width of valley lines by a set amount, as will be described later with reference to FIG. 2.

Figure 2:
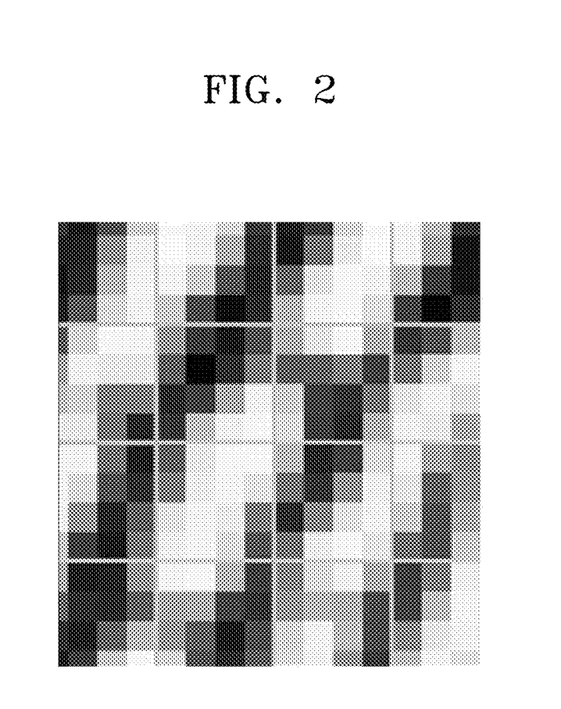
FIG. 2 is a schematic diagram illustrating sub-image segmentation of a fingerprint image according to an example embodiment of the present inventive concepts.

FIG. 2 is a schematic diagram illustrating sub-image segmentation of a fingerprint image according to an example embodiment of the present inventive concepts. Referring to FIG. 2, for a fingerprint image I having a size of N×N (wherein, N is a positive integer), a sub-image division may be made in accordance with a square shape. The widths of the ridge lines or valley lines of the fingerprint image illustrated in FIG. 2 is about 3 to 4 pixels. For example, a side length w (wherein w is a positive integer and less than N) of the sub-image may be set to 4 pixels (e.g., equal to or slightly greater than the average width of the ridge lines and/or the average width of the valley lines of the fingerprint image), to ensure that ridge lines are present in each of the sub-images in the foreground region of the fingerprint image. Here, the sub-images are the pooling windows used in step S120 to be carried out later. It should be understood that the number of pixels of the illustrated sub-images in FIG. 2 is only an example and not a limitation, and may be modified or altered by those skilled in the art according to the actual situation.

Return to FIG. 1, at step S120, each sub-image may be pooled to acquire a feature map of the fingerprint image.

For example, the pooling of each sub-image may include taking the smallest gray value included in the sub-image as a feature value of the sub-image, and acquiring the feature map of the fingerprint image based on the feature value of each sub-image. That is, the pooling in step S120 may be a minimum value pooling.

Taking the fingerprint image illustrated in FIG. 2 as an example, the sizes of the plurality of sub-images are all w×w, and the sub-images do not overlap each other. For each sub-image, the smallest gray value included in the sub-image may be used as the feature value of the sub-image to represent the sub-image, so that the feature map of size M×M may be obtained through all the sub-images, wherein $$M = \mathrm{ceil}\left(\frac{N}{w}\right)$$

(ceil is an upper rounding function). Only as an example and not as a limitation, if the fingerprint image has a size of 114×114 and the average width of the ridge lines is 4, the feature map with a size of 29×29 may be obtained at step S120.

Herein, only as an example and not as a limitation, the feature map may be filtered before proceeding to step S130 below. For example, the filtering of the feature map may include performing a set of operations for each feature value of the feature map. The set of operations may include comparing a respective feature value with neighboring feature values, determining the respective feature value to be a noise point if the respective feature value is less than a desired (or alternatively, predetermined) threshold T and a desired (or alternatively, predetermined) number of feature values, among the neighboring feature values, that are not less than the desired (or alternatively, predetermined) threshold T exist or if the respective feature value is not less than the desired (or alternatively, predetermined) threshold T and the desired (or alternatively, predetermined) number of feature values, among the neighboring feature values, that are less than the desired (or alternatively, predetermined) threshold T, exist, and replacing the feature value determined to be the noise point using an average of the neighboring feature values. Herein, the desired (or alternatively, predetermined) number of feature values described above may be divided into two cases. In the first case, if the feature values are not at the boundary of the feature map, the desired (or alternatively, predetermined) number of feature values may be three or more. In the second case, if the feature values are at the boundary of the feature map, the desired (or alternatively, predetermined) number of feature values may be two or more. It should be understood that the filtering process and the number of feature values and the like described herein are only examples and not limitations, and those skilled in the art may adopt or not adopt the filtering process and/or modify or change the number of feature values according to the actual situation.

Furthermore, only as an example and not as a limitation, the desired (or alternatively, predetermined) threshold value T in the above filtering process may be the smaller of the following two values (e.g., a smaller one of an average gray scale value of the fingerprint image and a pre-calculated average gray scale value based on a plurality of previously acquired fingerprint images). The desired (or alternatively, predetermined) threshold value T may be represented as in Equation 1 below.

$$T = \mathrm{MIN}\left(\frac{\sum_{i=0}^{N-1}\sum_{j=0}^{N-1}(I_{(i,j)})}{N \times N}, G\right) \quad \text{[Equation 1]}$$

Wherein, $I_{(i,j)}$ denotes a gray value at a (i,j) position of the fingerprint image I, N denotes the number of pixels of a side of the fingerprint image, and G denotes a pre-calculated average gray value based on a plurality of previously acquired fingerprint images.

Subsequently, at step S130, the feature map may be segmented based on a region growing algorithm to acquire a fingerprint region in the fingerprint image.

For example, the segmenting of the feature map may include adding at least one feature value at boundaries of the feature map to a seed sequence, and repeating a set of operations for a first feature value in the seed sequence until the seed sequence is empty. The set of operations may include, for the first feature value in the seed sequence, moving the first feature value out of the seed sequence if the first feature value is less than a desired (or alternatively, predetermined) threshold, and adding select neighboring feature values that are not less than the desired (or alternatively, predetermined) threshold, among a plurality of neighboring feature values of the first feature value that have never been added to the seed sequence, into the seed sequence, and moving the first feature value out of the seed sequence if the first feature value is not less than the desired (or alternatively, predetermined) threshold, and determining the sub-images corresponding to feature values in the feature map that have never been added to the seed sequence as the fingerprint region.

Herein, only as an example and not as a limitation, the at least one feature value at the above boundaries may be feature values at the upper left corner, the upper right corner, the lower left corner and the lower right corner of the feature map F. Thus, for the feature map F of size M×M, a seed sequence Seed=$\{F_{0,0}, F_{0,M-1}, F_{M-1,0}, F_{M-1,M-1}\}$ may be obtained, and the above-described operations may subsequently be performed on the seed sequence until the seed sequence is empty. Furthermore, the desired (or alternatively, predetermined) threshold described above may be the desired (or alternatively, predetermined) threshold T described with reference to Equation 1.

Figure 3:
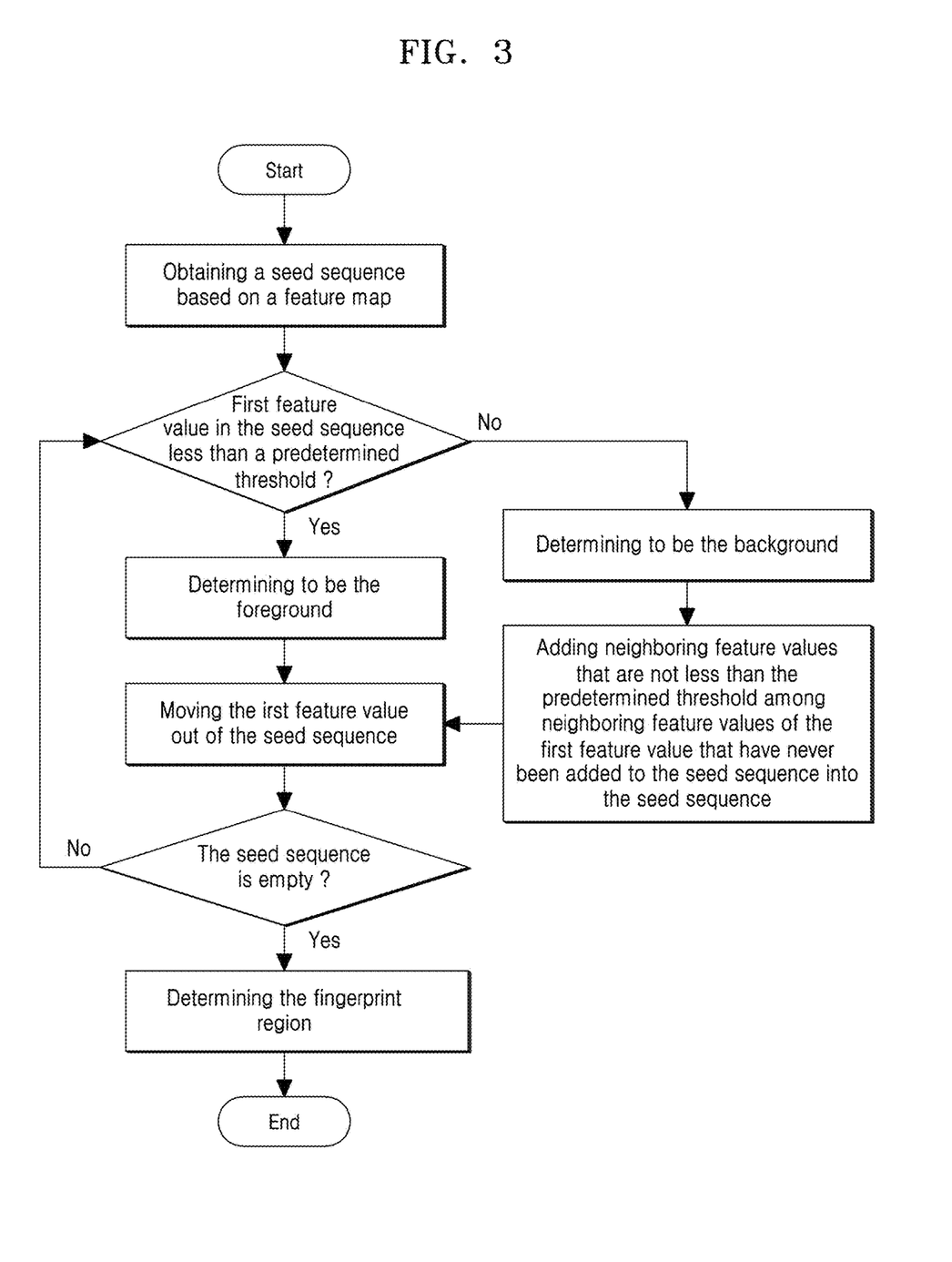
FIG. 3 is a schematic diagram illustrating a region growing algorithm according to an example embodiment of the present inventive concepts.

FIG. 3 is a schematic diagram illustrating the region growing algorithm according to an example embodiment of the present inventive concepts. Referring to FIG. 3, it is determined whether a first feature value in the seed sequence is less than a desired (or alternatively, predetermined) threshold. If the first feature value is less than the desired (or alternatively, predetermined) threshold, the first feature value is the foreground, and the first feature value is moved out of the seed sequence. If the first feature value is not less than the desired (or alternatively, predetermined) threshold, the first feature value is the background, and neighboring feature values that are not less than the desired (or alternatively, predetermined) threshold among neighboring feature values of the first feature value that have never been added to the seed sequence are added into the seed sequence, and the first feature value is moved out of the seed sequence. Subsequently, it is determined whether the seed sequence is empty. If it is not empty, the process described above is repeated. If it is empty, the process ends, and sub-images corresponding to feature values in the feature map that have never been added to the seed sequence may be determined to be the fingerprint region. It should be understood that the region growing algorithm described in FIG. 3 is only an example and not a limitation, and those skilled in the art may modify or change the steps therein according to the actual situation.

Figure 4:
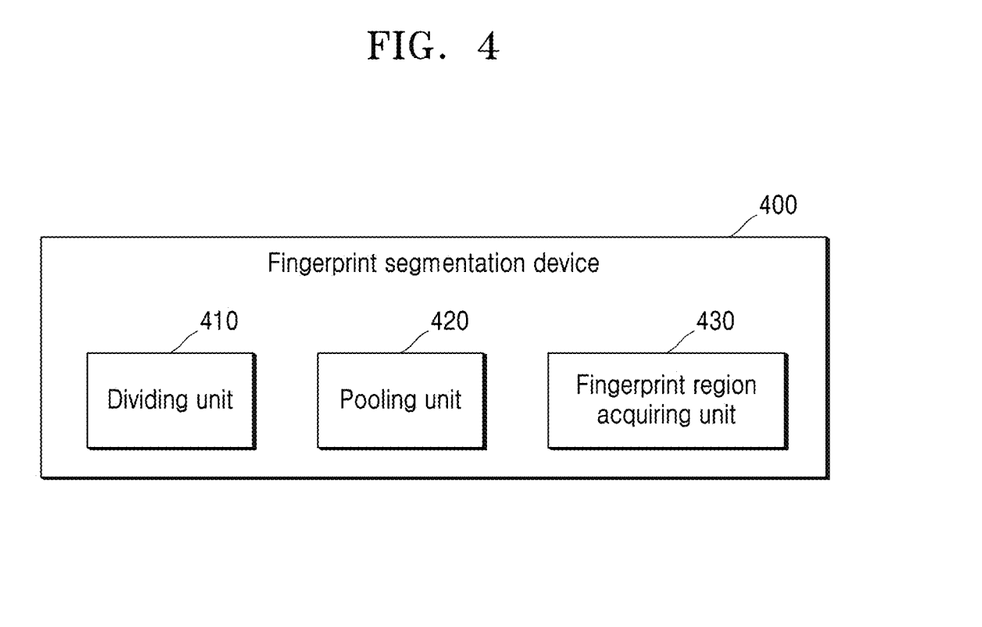
FIG. 4 is a block diagram illustrating a fingerprint segmentation device according to an example embodiment of the present inventive concepts.

FIG. 4 is a block diagram illustrating a fingerprint segmentation device according to an example embodiment of the present inventive concepts.

Referring to FIG. 4, the fingerprint segmentation device 400 according to an example embodiment of the present inventive concepts may include a dividing unit 410, a pooling unit 420, and a fingerprint region acquiring unit 430.

The dividing unit 410 may be configured to divide a fingerprint image into a plurality of sub-images. Herein, only as an example and not as a limitation, the sub-images may have a square shape and side lengths are equal to or greater than an average width of ridge lines and/or an average width of valley lines of the fingerprint image.

The pooling unit 420 may be configured to pool each sub-image to acquire a feature map of the fingerprint image. The pooling unit 420 may be further configured to take the smallest gray value included in the sub-image as a feature value of the sub-image and acquire the feature map of the fingerprint image based on the feature value of each sub-image.

The fingerprint region acquiring unit 430 may be configured to segment the feature map based on a region growing algorithm to acquire a fingerprint region in the fingerprint image. The fingerprint region acquiring unit 430 may be further configured to add at least one feature value at boundaries of the feature map to a seed sequence and repeat a set of operations for a first feature value in the seed sequence until the seed sequence is empty. The set of operations may include, for the first feature value in the seed sequence, moving the first feature value out of the seed sequence if the first feature value is less than a desired (or alternatively, predetermined) threshold, adding select neighboring feature values that are not less than the desired (or alternatively, predetermined) threshold, among a plurality of neighboring feature values of the first feature value that have never been added to the seed sequence into the seed sequence, and moving the first feature value out of the seed sequence if the first feature value is not less than the desired (or alternatively, predetermined) threshold, and determining the sub-images corresponding to feature values in the feature map that have never been added to the seed sequence as the fingerprint region.

Herein, only as an example and not as a limitation, the desired (or alternatively, predetermined) threshold may be the smaller of the following two values (e.g., a smaller one of an average gray value of the fingerprint image and a pre-calculated average gray value based on a plurality of previously acquired fingerprint images).

In addition, the fingerprint segmentation device 400 according to an example embodiment of the present inventive concepts may further include a filtering unit that is configured to filter the feature map before segmenting the feature map. The filtering unit may be further configured to perform a set of operations for each feature value of the feature map. The set of operations may include comparing a respective feature value with neighboring feature values, determining the respective feature value to be a noise point if the respective feature value is less than a desired (or alternatively, predetermined) threshold and a desired (or alternatively, predetermined) number of feature values, among neighboring feature values that are not less than the desired (or alternatively, predetermined) threshold exist or if the respective feature value is not less than the desired (or alternatively, predetermined) threshold and the desired (or alternatively, predetermined) number of feature values, among the neighboring feature values that are less than the desired (or alternatively, predetermined) threshold exist, and replacing the respective feature value determined to be the noise point using an average of the neighboring feature values.

Any functional blocks or unit, shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Figure 5:
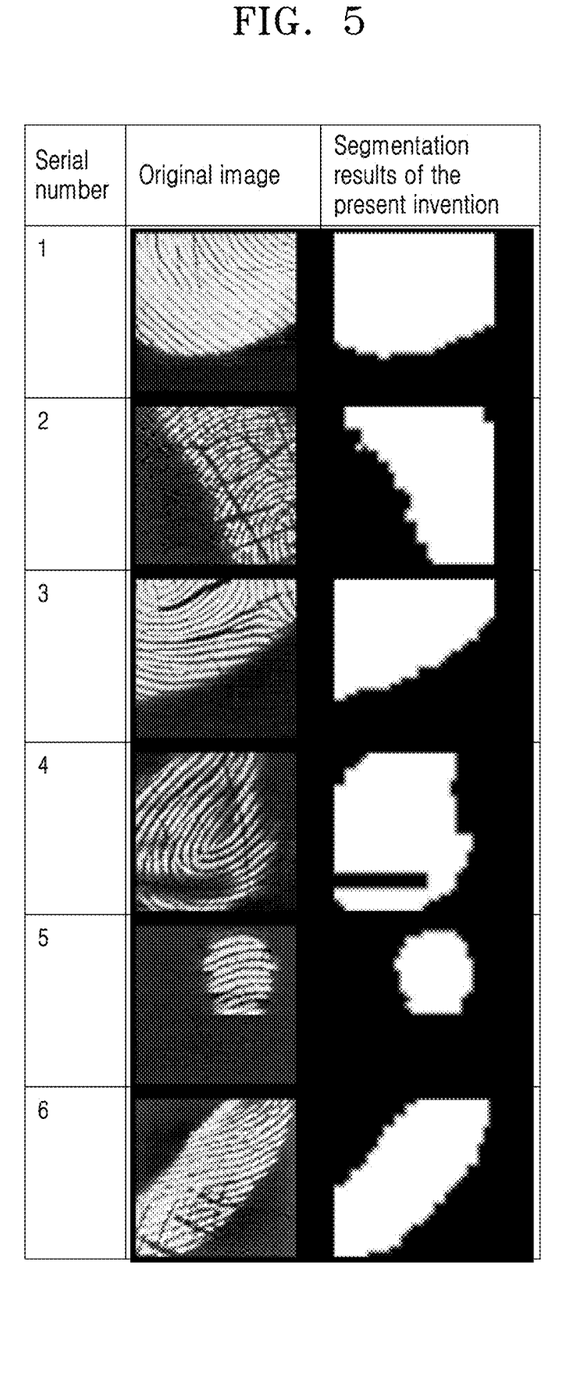
FIG. 5 is a schematic diagram illustrating a fingerprint segmentation effect according to an example embodiment of the present inventive concepts.

FIG. 5 is a schematic diagram illustrating a fingerprint segmentation effect according to an example embodiment of the present inventive concepts. As shown in FIG. 5, the fingerprint segmentation method and device according to some example embodiments of the present inventive concepts are capable of guaranteeing the segmentation effect.

According to another example embodiment of the present disclosure, there is provided an electronic device including a memory having computer-executable instructions stored thereon and a processor, the instructions, when executed by the processor, perform the method described previously.

According to another example embodiment of the present disclosure, there is provided a computer readable medium having computer-executable instructions stored thereon, the instructions, when executed, perform the method described previously. According to an example embodiment of the present disclosure, there is provided a computer-readable storage medium having instructions stored thereon, when executed, performing the foregoing method. Examples of computer-readable storage media here may include read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

According to some example embodiments of the present disclosure, the algorithm complexity may be greatly reduced by using a pooling operation, the number of times of the foreground and background discrimination may be reduced by using a filtering operation and a region growing algorithm, thereby accelerating the segmentation speed, obtaining the segmentation results quickly, and guaranteeing the segmentation effect at the same time, the speed of the foreground and background discrimination may be greatly improved by applying adaptive thresholds to the filtering and the segmentation operations, and furthermore, when applied to a quality control module in a fingerprint recognition device, small area fingerprint images (such as fingerprint images with the foreground area less than 70%) may be rejected more accurately. Thus, the fingerprint segmentation method and device according to some example embodiments of the present inventive concepts may be applied to the embedded fingerprint recognition device that has few computational resources and high latency requirements, such as smart card, and there is almost no increase the latency and memory usage in fingerprint entry and quality inspection process.

Although the present disclosure has been shown and described with reference to some particular example embodiments, those skilled in the art will understand that various changes in form and detail may be made without departing from a spirit and scope of the present disclosure as limited by the claims and equivalents thereof.

What is claimed is:

1. A fingerprint segmentation method, comprising:
dividing a fingerprint image into a plurality of sub-images;
pooling each of the sub-images to acquire a feature map of the fingerprint image; and
segmenting the feature map based on a region growing algorithm to acquire a fingerprint region in the fingerprint image,
wherein the segmenting of the feature map comprises:
adding at least one feature value at boundaries of the feature map to a seed sequence; and
repeating a set of operations for a first feature value in the seed sequence until the seed sequence is empty.

2. The fingerprint segmentation method of claim 1, wherein the sub-images each have a square shape, and side lengths or the sub-images are equal to or greater than an average width of ridge lines and/or an average width of valley lines of the fingerprint image.

3. The fingerprint segmentation method of claim 1, wherein the pooling of the sub-images comprises:
taking a smallest gray value included in each of the sub-images as a feature value thereof; and
acquiring the feature map of the fingerprint image based on the feature value of each of the sub-images.

4. The fingerprint segmentation method of claim 1, further comprising:
filtering the feature map before segmenting the feature map.

5. The fingerprint segmentation method of claim 4, wherein the filtering of the feature map comprises performing a set of operations for each feature value of the feature map, the set of operations including,
determining a respective feature value to be a noise point if the respective feature value is less than a threshold and a number of feature values, among a plurality of neighboring feature values, that are not less than the threshold exist or if the respective feature value is not less than the threshold and the number of feature values, among the neighboring feature values, that are less than the threshold, exist, and
replacing the respective feature value determined to be the noise point using an average of the neighboring feature values.

6. The fingerprint segmentation method of claim 5, wherein the threshold is a smaller one of an average gray value of the fingerprint image and a pre-calculated average gray value based on a plurality of previously acquired fingerprint images.

7. The fingerprint segmentation method of claim 1, wherein
the set of operations includes, for the first feature value in the seed sequence, (1) moving the first feature value out of the seed sequence if the first feature value is less than a threshold, and adding select neighboring feature values that are not less than the threshold, among a plurality of neighboring feature values of the first feature value that have never been added to the seed sequence, into the seed sequence and (2) moving the first feature value out of the seed sequence if the first feature value is not less than the threshold, and
wherein the segmenting of the feature map comprises determining the sub-images corresponding to feature values in the feature map that have never been added to the seed sequence as the fingerprint region.

8. A fingerprint segmentation device, comprising:
one or more processors configured to,
divide a fingerprint image into a plurality of sub-images,
pool each sub-image to acquire a feature map of the fingerprint image,
segment the feature map based on a region growing algorithm to acquire a fingerprint region in the fingerprint image,
add at least one feature value at boundaries of the feature map to a seed sequence, and
repeat a set of operations for a first feature value in the seed sequence until the seed sequence is empty.

9. The fingerprint segmentation device of claim 8, wherein the sub-images have a square shape, and side lengths of the sub-images are equal to or greater than an average width of ridge lines and/or an average width of valley lines of the fingerprint image.

10. The fingerprint segmentation device of claim 8, wherein the one or more processors are further configured to:
take a smallest gray value included in each of the sub-images as a feature value thereof; and
acquire the feature map of the fingerprint image based on the feature value of each of the sub-images.

11. The fingerprint segmentation device of claim 8, wherein the one or more processors are further configured to filter the feature map before segmenting the feature map.

12. The fingerprint segmentation device of claim 11, wherein the one or more processors are further configured to perform a set of operations for each feature value of the feature map, the set of operations including,
determining a respective feature value to be a noise point if the respective feature value is less than a threshold and a number of feature values, among a plurality of neighboring feature values, that are not less than the threshold exist or if the respective feature value is not less than the threshold and the number of feature values, among the neighboring feature values, that are less than the threshold exist, and
replacing the respective feature value determined to be the noise point using an average of the neighboring feature values.

13. The fingerprint segmentation device of claim 12, wherein the threshold is a smaller one of an average gray value of the fingerprint image and a pre-calculated average gray value based on a plurality of previously acquired fingerprint images.

14. The fingerprint segmentation device of claim 8, wherein
the set of operations includes, for the first feature value in the seed sequence, (1) moving the first feature value out of the seed sequence if the first feature value is less than a threshold, and adding select neighboring feature values that are not less than the threshold, among a plurality of neighboring feature values of the first feature value that have never been added to the seed sequence, into the seed sequence and (2) moving the first feature value out of the seed sequence if the first feature value is not less than the threshold, and
wherein the one or more processors are further configured to determine the sub-images corresponding to feature values in the feature map that have never been added to the seed sequence as the fingerprint region.

15. A non-transitory computer readable medium having computer-executable instructions stored thereon, which when executed by one or more processors, cause a fingerprint segmentation device to perform a method comprising:
dividing a fingerprint image into a plurality of sub-images;
pooling each of the sub-images to acquire a feature map of the fingerprint image; and
segmenting the feature map based on a region growing algorithm to acquire a fingerprint region in the fingerprint image,
wherein the segmenting of the feature map comprises:
adding at least one feature value at boundaries of the feature map to a seed sequence; and
repeating a set of operations for a first feature value in the seed sequence until the seed sequence is empty.

16. The non-transitory computer readable medium of claim 15, wherein the pooling of the sub-images comprises:
taking a smallest gray value included in each of the sub-images as a feature value thereof; and
acquiring the feature map of the fingerprint image based on the feature value of each of the sub-images.

17. The non-transitory computer readable medium of claim 15, wherein the method further comprises:
filtering the feature map before segmenting the feature map,
wherein the filtering of the feature map comprises performing a set of operations for each feature value of the feature map, the set of operations including,
determining a respective feature value to be a noise point if the respective feature value is less than a threshold and a number of feature values, among a plurality of neighboring feature values, that are not less than the threshold exist or if the respective feature value is not less than the threshold and the number of feature values, among the neighboring feature values, that are less than the threshold, exist, and
replacing the respective feature value determined to be the noise point using an average of the neighboring feature values.

18. The non-transitory computer readable medium of claim 17, wherein the threshold is a smaller one of an average gray value of the fingerprint image and a pre-calculated average gray value based on a plurality of previously acquired fingerprint images.

19. The non-transitory computer readable medium of claim 15, wherein the set of operations including, for the first feature value in the seed sequence, (1) moving the first feature value out of the seed sequence if the first feature value is less than a threshold, and adding select neighboring feature values that are not less than the threshold, among a plurality of neighboring feature values of the first feature value that have never been added to the seed sequence, into the seed sequence and (2) moving the first feature value out of the seed sequence if the first feature value is not less than the threshold, and     wherein the segmenting of the feature map comprises determining the sub-images corresponding to feature values in the feature map that have never been added to the seed sequence as the fingerprint region.

\* \* \* \* \*